US012674286B2

(12) United States Patent
Keller et al.

(10) Patent No.: US 12,674,286 B2
(45) Date of Patent: Jul. 7, 2026

(54) AMPLITUDE SETTING DETECTION FOR VIBRATORY SURFACE COMPACTOR

(71) Applicant: VOLVO CONSTRUCTION EQUIPMENT AB, Eskilstuna (SE)

(72) Inventors: Scott Keller, Chambersburg, PA (US); Sangryu Lee, Chambersburg, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 653 days.

(21) Appl. No.: 18/031,787

(22) PCT Filed: Oct. 13, 2021

(86) PCT No.: PCT/IB2021/059424

§ 371 (c)(1),
(2) Date: Apr. 13, 2023

(87) PCT Pub. No.: WO2022/079643

PCT Pub. Date: Apr. 21, 2022

(65) Prior Publication Data

US 2023/0392325 A1 Dec. 7, 2023

Related U.S. Application Data

(60) Provisional application No. 63/091,919, filed on Oct. 14, 2020.

(51) Int. Cl.
*B06B 1/16* (2006.01)
*E01C 19/28* (2006.01)

(52) U.S. Cl.
CPC .............. *E01C 19/286* (2013.01); *B06B 1/16* (2013.01)

(58) Field of Classification Search
CPC ....... E01C 19/286; E01C 19/288; B06B 1/16; E02D 3/039; E02D 3/046
See application file for complete search history.

(56) References Cited

U.S. PATENT DOCUMENTS 5,695,298 A * 12/1997 Sandstrom ............ E01C 19/286 404/133.05
5,727,900 A 3/1998 Sandstrom
(Continued)

FOREIGN PATENT DOCUMENTS

WO WO-2018174853 A1 * 9/2018 ............ E02D 3/026
WO 20200032974 A1 2/2020
WO WO-2020067984 A1 * 4/2020 ........... E01C 19/233

OTHER PUBLICATIONS

European Office Action, European Application No. 2180242.2, mailed Mar. 18, 2024, 6 pages.
(Continued)

*Primary Examiner* — Abigail A Risic
(74) *Attorney, Agent, or Firm* — Sage Patent Group

(57) ABSTRACT

A vibratory compaction machine includes a chassis, at least one drum, and a control system. The at least one drum is rotatable about an axis that faces in a Y-axial direction and is mounted to the chassis to allow rotation of the drum over a work surface. The at least one vibration mechanism is configured to generate vibrations that are transmitted as impacts directed in a Z-axial direction by the at least one drum to the work surface. The at least one vibration mechanism is provided with a plurality of different amplitude settings. The control system is configured to measure acceleration forces of the at least one drum in a direction that substantially corresponds to an X-axial direction, wherein the acceleration forces are generated by the vibration mechanism and the X-axial direction extends in a direction that is substantially orthogonal to the Y-axial direction and the Z-axial direction.

12 Claims, 7 Drawing Sheets

(56) References Cited

U.S. PATENT DOCUMENTS

| | | | | |
|---|---|---|---|---|
| 7,089,823 | B2 * | 8/2006 | Potts | E01C 19/288<br>74/61 |
| 7,938,595 | B2 * | 5/2011 | Potts | E01C 19/288<br>404/84.1 |
| 8,142,103 | B2 * | 3/2012 | Wolf | E01C 19/288<br>404/117 |
| 10,301,781 | B2 * | 5/2019 | Laugwitz | G01N 29/12 |
| 2006/0034657 | A1 | 2/2006 | Rio et al. | |
| 2015/0260626 | A1 * | 9/2015 | Frelich | E01C 19/288<br>73/32 A |
| 2021/0340714 | A1 * | 11/2021 | Persson | E02D 3/046 |
| 2022/0025589 | A1 * | 1/2022 | Oetken | E01C 19/288 |
| 2022/0341103 | A1 * | 10/2022 | Christensen | E01C 19/286 |

OTHER PUBLICATIONS

International Search Report and Written Opinion of the International Searching Authority, PCT/IB2021/059424, mailed Jan. 17, 2022, 9 pages.

* cited by examiner

AMPLITUDE SETTING DETECTION FOR VIBRATORY SURFACE COMPACTOR

CROSS REFERENCE TO RELATED APPLICATIONS

This application is a 35 U.S.C. § 371 national stage application of PCT International Application No. PCT/IB2021/059424 filed on Oct. 13, 2021, which in turns claims domestic priority to U.S. Provisional Patent Application No. 63/091,919, filed on Oct. 14, 2020, the disclosures and content of which are incorporated by reference herein in their entirety.

TECHNICAL FIELD

The present disclosure relates to the field of compaction machines, and more particularly, to vibratory compaction machines and related control systems and methods.

BACKGROUND

A compaction machine may include a chassis and two vibrating drums rotatably mounted to the chassis so that the drums compact a work surface (e.g., an asphalt mat) as the compaction machine moves thereon. A compaction machine may include eccentric masses (also referred to as eccentric shafts) in the respective drums that are rotated at speed to generate vibrations that are transmitted as impacts by the drums to the work surface. Various examples of compaction machines are discussed, for example, in U.S. Pat. No. 3,871,788 entitled "Vibrating Roller," U.S. Pat. No. 7,674,070 entitled "Vibratory System For Compactor Vehicles," and U.S. Publication No. 2003/0026657 entitled "Apparatus And Method For Controlling the Start Up And Phase Relationship Between Eccentric Assemblies."

Notwithstanding known compaction machines, there continues to exist a need in the art for compaction machines, methods, and/or controllers providing increased efficiency of operation and/or improved compaction.

SUMMARY

A vibratory compaction machine according to one embodiment comprises a chassis, at least one drum rotatable about an axis that faces in a Y-axial direction and mounted to the chassis to allow rotation of the drum over a work surface, at least one vibration mechanism configured to generate vibrations that are transmitted as impacts directed in a Z-axial direction by the at least one drum to the work surface, the at least one vibration mechanism provided with a plurality of different amplitude settings, and a control system configured to measure acceleration forces of the at least one drum in a direction that substantially corresponds to an X-axial direction, wherein the acceleration forces are generated by the vibration mechanism and the X-axial direction extends in a direction that is substantially orthogonal to the Y-axial direction and the Z-axial direction, the control system determining which of the plurality of drum amplitude settings the vibration mechanism is operating at from the measured acceleration forces of the at least one drum in the direction that substantially corresponds to an X-axial direction.

According to another embodiment, a method for operating a vibratory compaction machine provided with a chassis, at least one drum rotatable about an axis that faces in a Y-axial direction and mounted to the chassis to allow rotation of the drum over a work surface, and at least one vibration mechanism provided with a plurality of different amplitude settings and configured to generate vibrations that are transmitted as impacts directed in a Z-axial direction by the at least one drum to the work surface, the at least one vibration mechanism, comprises the steps of operating the vibration mechanism to generate acceleration forces in the drum in an X-axial direction, wherein the X-axial direction extends in a direction that is substantially orthogonal to the Y-axial direction and the Z-axial direction, using a control system provided on the vibratory compaction machine to measure acceleration forces of the at least one drum in a direction that substantially corresponds to the X-axial direction, wherein the acceleration forces are generated by the vibration mechanism, and using the control system to determine which of the plurality of drum amplitude settings the vibration mechanism is operating at from the measured acceleration forces of the at least one drum in the direction that substantially corresponds to an X-axial direction.

Aspects

According to an aspect of an embodiment, a vibratory compaction machine comprises a chassis, at least one drum rotatable about an axis that faces in a Y-axial direction and mounted to the chassis to allow rotation of the drum over a work surface, at least one vibration mechanism configured to generate vibrations that are transmitted as impacts directed in a Z-axial direction by the at least one drum to the work surface, the at least one vibration mechanism provided with a plurality of different amplitude settings, and a control system configured to measure acceleration forces of the at least one drum in a direction that substantially corresponds to an X-axial direction, wherein the acceleration forces are generated by the vibration mechanism and the X-axial direction extends in a direction that is substantially orthogonal to the Y-axial direction and the Z-axial direction, the control system determining which of the plurality of drum amplitude settings the vibration mechanism is operating at from the measured acceleration forces of the at least one drum in the direction that substantially corresponds to an X-axial direction.

According to an aspect of an embodiment, the at least one vibration mechanism is provided with a plurality of different frequency settings and the control system selects a frequency setting from the plurality of different frequency settings according to the determined amplitude setting, whereby different determined amplitude settings result in selection of different frequency settings, and the control system operates the vibration system at the selected frequency.

According to an aspect of an embodiment, the at least one vibration mechanism is provided with a plurality of frequency settings, wherein each of the plurality of frequency settings corresponds to one of the plurality of amplitude settings such that each of the plurality of different frequency settings may be selectively applied according to the determined amplitude setting and the control system selects one of the plurality of frequency settings according to the determined amplitude setting, and the control system operates the vibration system at the one selected frequency.

According to an aspect of an embodiment, the at least one vibration mechanism is provided with a plurality of frequency settings, wherein each of the plurality of frequency settings corresponds to one of the plurality of amplitude settings such that each of the plurality of different frequency settings may be selectively applied according to the determined amplitude setting and the control system selects one of the plurality of frequency settings according to the determined amplitude setting, operates the vibration system at the selected frequency, and selects a new frequency setting in response to a change to the determined amplitude and operates the vibration system at the new selected frequency.

According to an aspect of an embodiment, the at least one vibration mechanism is provided with a plurality of frequency settings, wherein each of the plurality of frequency settings corresponds to one of the plurality of amplitude settings such that each of the plurality of different frequency settings may be selectively applied according to the determined amplitude setting and the control system selects one of the plurality of frequency settings according to the determined amplitude setting, operates the vibration system at the selected frequency, remeasures acceleration forces generated by the vibration mechanism in the direction that substantially corresponds to the X-axial direction, re-determines which of the plurality of drum amplitude settings the vibration mechanism is operating at from the remeasured acceleration forces generated by the vibration mechanism in a direction that substantially corresponds to an X-axial direction, selects a different one of the plurality of frequency settings when the re-determined amplitude setting is different from the determined amplitude setting and corresponds to the selected different one of the plurality of frequency settings, and operates the vibration system at the different selected frequency.

According to an aspect of an embodiment, the at least one vibration mechanism is provided with a plurality of frequency settings, wherein each of the plurality of frequency settings corresponds to one of the plurality of amplitude settings such that each of the plurality of different frequency settings may be selectively applied according to the determined amplitude setting and the control system selects one of the plurality of frequency settings according to the determined amplitude setting, operates the vibration system at the selected frequency, remeasures acceleration forces acceleration forces of the at least one drum in the direction that substantially corresponds to an X-axial direction, re-determines which of the plurality of drum amplitude settings the vibration mechanism is operating at from the remeasured acceleration forces, selects a different one of the plurality of frequency settings that is greater than the frequency of the selected frequency when the re-determined amplitude setting is less than the amplitude of the determined amplitude setting and corresponds to the selected different one of the plurality of frequency settings; and operates the vibration system at the different selected frequency.

According to an aspect of an embodiment, the control system includes accelerometers located on a carrier plate that supports a drum axle rotation bearing of the at least one drum in a manner that allows for rotation of the at least one drum relative to the carrier plate and the carrier plate is located inside the at least one drum axially inward from vibration isolators, which are interposed between carrier plate and a frame so that drum vibrations imparted to the carrier plate by the drum axle rotation bearings are damped and reduced after being measured by the accelerometers and before being transmitted to a frame of the vibration compactor.

According to an aspect of an embodiment, the control system includes a controller and at least one accelerometer.

According to an aspect of an embodiment, a method for operating a vibratory compaction machine provided with a chassis, at least one drum rotatable about an axis that faces in a Y-axial direction and mounted to the chassis to allow rotation of the drum over a work surface, and at least one vibration mechanism provided with a plurality of different amplitude settings and configured to generate vibrations that are transmitted as impacts directed in a Z-axial direction by the at least one drum to the work surface, the at least one vibration mechanism, comprises the steps of operating the vibration mechanism to generate acceleration forces in the drum in an X-axial direction, wherein the X-axial direction extends in a direction that is substantially orthogonal to the Y-axial direction and the Z-axial direction, using a control system that includes at least one accelerometer and a controller and is provided on the vibratory compaction machine to measure acceleration forces of the at least one drum in a direction that substantially corresponds to the X-axial direction, wherein the acceleration forces are generated by the vibration mechanism and using the control system to determine which of the plurality of drum amplitude settings the vibration mechanism is operating at from the measured acceleration forces of the at least one drum in the direction that substantially corresponds to an X-axial direction.

According to an aspect of an embodiment, the at least one vibration mechanism is provided with a plurality of different frequency settings and the method further comprises the steps of using the control system to select a frequency setting from the plurality of different frequency settings according to the determined amplitude setting, whereby different determined amplitude settings result in selection of different frequency settings and using the control system to operate the vibration system at the selected frequency.

According to an aspect of an embodiment, the at least one vibration mechanism is provided with a plurality of different frequency settings, each of the plurality of frequency settings corresponding to one of the plurality of amplitude settings such that each of the plurality of different frequency settings may be selectively applied according to the determined amplitude setting and the method further comprises the steps of using the control system to select one of the plurality of frequency settings from the according to the determined amplitude setting and using the control system to operate the vibration system at the one selected frequency.

According to an aspect of an embodiment, the at least one vibration mechanism is provided with a plurality of frequency settings, each of the plurality of frequency settings corresponding to one of the plurality of amplitude settings such that each of the plurality of different frequency settings may be selectively applied according to the determined amplitude setting and the method further comprises the steps of using the control system to select one of the plurality of frequency settings according to the determined amplitude setting, operate the vibration system at the selected frequency, select a new frequency setting in response to a change to the determined amplitude, and operate the vibration system at the new selected frequency.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Figure 1:
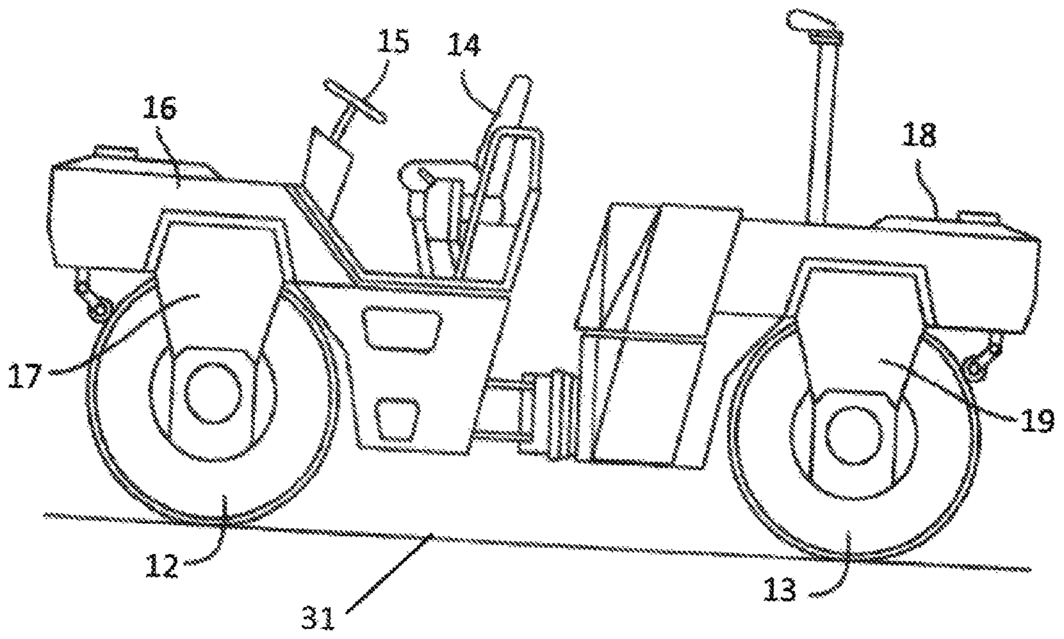
FIG. 1 is a side view of a compaction machine according to some embodiments of inventive concepts.

FIG. 1 illustrates a self-propelled compaction machine according to some embodiments of inventive concepts. The compaction machine of FIG. 1 may include a chassis 16, 18, first (e.g., leading) and second (e.g., trailing) rotatable drums 12 and 13 at the front and back at of the chassis 16, 18, and a driver station including a seat 14 and a steering mechanism 15 (e.g., a steering wheel) to provide driver control of the compaction machine. Moreover, each drum may be coupled to the chassis 16, 18 using respective frames, as at 17, 19 (also referred to as yokes). One or both drums 12, 13 may be driven by a drive motor over a work surface 31. Although FIG. 1 shows a dual drum compaction machine, in alternative embodiments, a single compaction drum may be provided.

Figure 2:
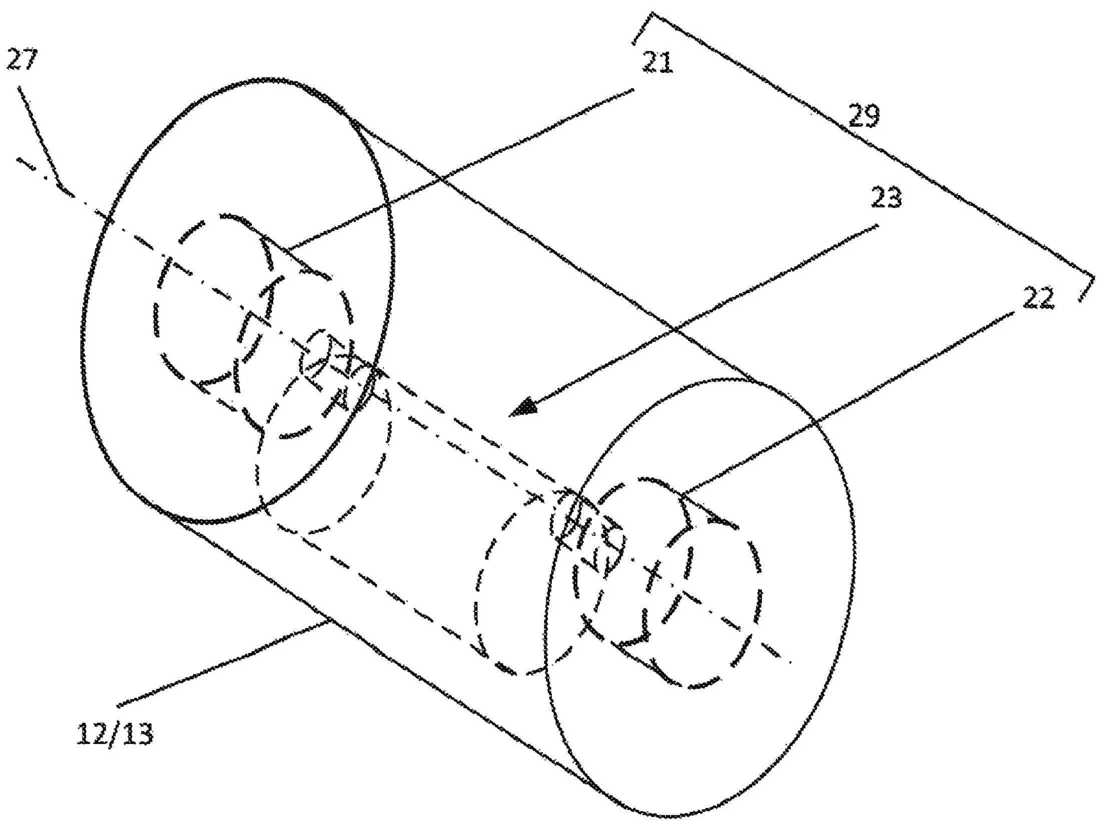
FIG. 2 is a perspective view of a drum of the compaction machine of FIG. 1 including a vibration motor and eccentric assembly according to some embodiments of inventive concepts.

Each of drums 12 and 13 also includes a vibration mechanism 29. Within the scope of the present embodiment the vibration mechanism 29 may be any device or devices, such as, for example, a variety of eccentric rotating mass systems, that are capable of generating vibrations transmitted as impacts by the first and second drums 12 and 13 to the work surface 31. By way of example, the vibration mechanism 29 may be provided using: one eccentric assembly including a single eccentric shaft (single amplitude machine); one eccentric assembly including two eccentric shafts; or multiple eccentric assemblies including single and/or double eccentric shaft systems (oscillatory machines). Those of ordinary skill in the art will appreciate that numerous vibration mechanisms are known, and the scope of the present embodiment is not limited to the particular vibration system 29 illustrated. While lesser or more complex eccentric systems may be employed within the scope of the present embodiment, for the sake of simplicity and brevity, FIG. 2, shows a relatively simple vibration mechanism 29 that includes a single rotatable eccentric mass 23, which may, for example, be driven by an eccentric motor 21 and supported by a bearing 22. Those of ordinary skill in the art will appreciate that the center of mass of the eccentric mass 23 is imbalanced and does not reside on the rotational axis 27 about which the eccentric mass 23 rotates. Those of ordinary skill in the art will also appreciate that, for purposes of increasing compaction efficiency, the imbalanced nature of the eccentric mass 23 of each drum 12, 13 imparts vibration to the drums 12, 13 as the eccentric mass rotates about rotational axis 27. Those of ordinary skill in the art will also appreciate that as the eccentric mass 23 rotates that the eccentric mass 23 generates a downward force that is transmitted as an impact by the drums 12, 13 to the work surface 31. Furthermore, those of ordinary skill in the art will appreciate that as the eccentric mass 23 rotates, the eccentric mass also generates an upward force which urges the drums 12, 13 upward, relative to the occurrence of a downward impact force. The eccentric system 29 is preferably driven by hydraulic motors 21, however, it is within the scope of the present embodiment to utilize electric motors 21, as well.

Figure 3A:
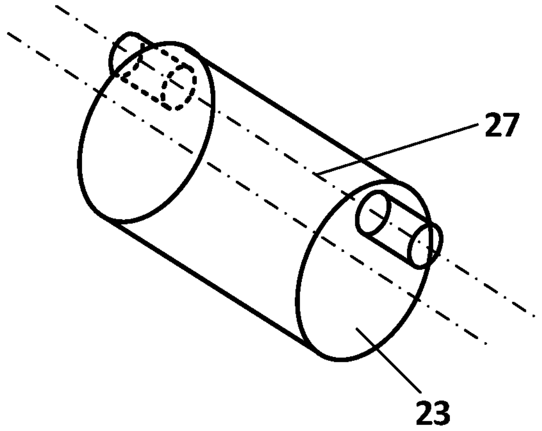
FIG. 3A is a perspective view of the eccentric assembly shown in FIG. 2.
Figure 3B:
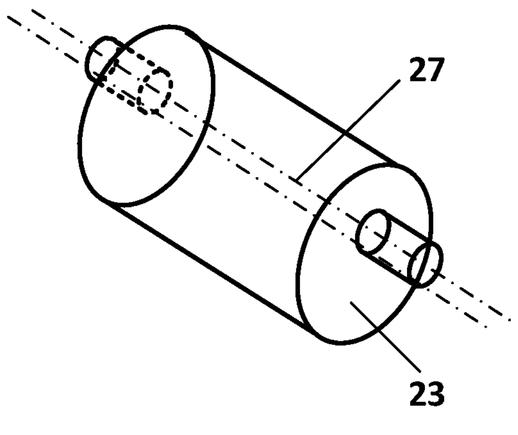
FIG. 3B is a perspective view of the eccentric assembly shown in FIG. 3A showing a relative adjustment to the eccentricity of the eccentric mass in FIG. 3A.

During operation, eccentric mass 23 may be rotated to generate vibrations transmitted as impacts by the first and second drums 12 and 13 to the work surface 31. Those of ordinary skill in the art will appreciate that the amplitude of the vibration system 29 and the impacts of the present embodiment may be adjusted by increasing or decreasing the eccentricity of center of mass of the eccentric 23 relative to the rotational axis 27, as shown by a comparison between FIGS. 3A and 3B, such that a plurality of amplitude settings are available for the vibration system 29. Those of ordinary skill in the art will appreciate that the frequency of impacts may be adjusted by increasing or decreasing the speed of rotation of the eccentric 23 about the rotational axis 27, such that a plurality of frequency settings are available for the vibration system 29. Those of ordinary skill in the art will appreciate that the optimal frequency of impacts varies according to the amplitude setting of the vibration system 29. By way of example, those of ordinary skill in the art will appreciate that as amplitude increases it may be desirable to decrease the frequency to prevent undue wear and tear on the eccentric assembly bearings and other components of the machine.

According to one aspect of the present embodiment, a control system 100 is provided for automatically detecting the amplitude setting of the vibration system 29. According to another aspect of the present embodiment, the control system 100 and automatically determines and selects the appropriate corresponding frequency setting for the vibration system 29 at the detected amplitude setting. According to another aspect of the present embodiment, the control system 100 preferably operates the vibration system at the selected frequency setting. According to yet another aspect of the present embodiment, the control system 100 may operate the vibration system 29 at the fastest frequency setting for the vibration system 29 at the detected amplitude setting.

Figure 5:
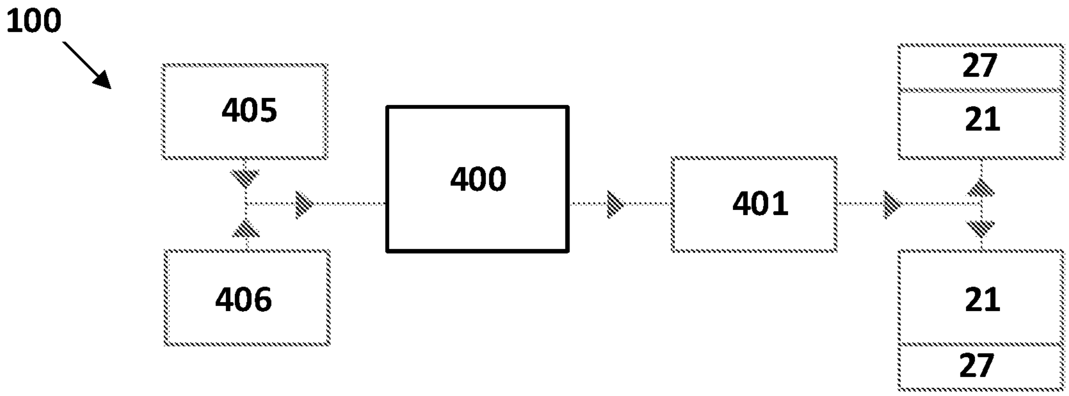
FIG. 5 shows a schematic of a control system according to one embodiment.
Figure 6:
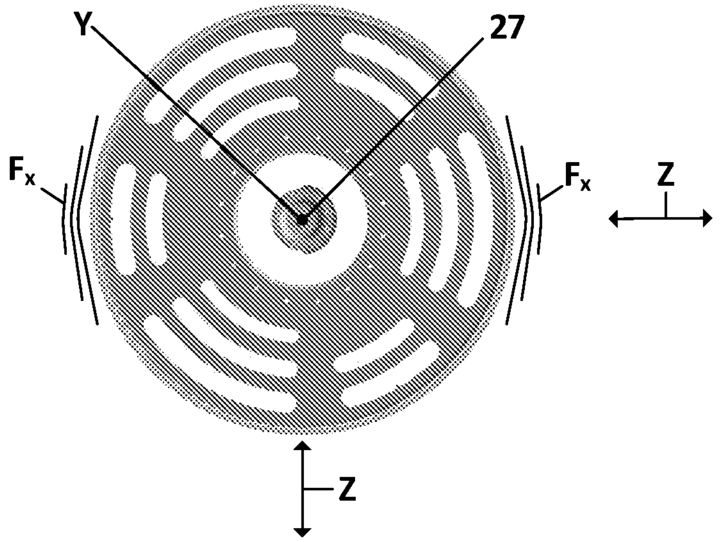
FIG. 6 shows a side view of a drum and eccentric system and the relative orientation of the X, Y, and Z axial directions according to one embodiment.
Figure 7:
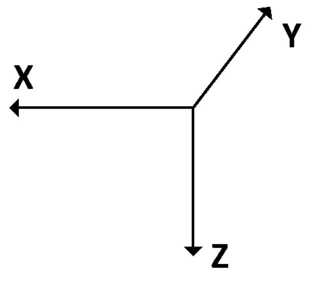
FIG. 7 shows the relative orientation of the X, Y, and Z axial directions according to one embodiment.

Turning now to FIG. 5, a control system 100 may include controller 400 configured to automatically control the rotational speed/frequency of the vibration mechanisms 29 of the first and second drums 12 and 13 responsive to the detected amplitude setting of the vibration mechanisms 29 of the first and second drums 12 and 13. Also shown, in FIGS. 5 and 6, control system 100 may also include first and second accelerometers 405, 406 that measure acceleration forces $F_x$ of drums 12 and 13 in X-axis direction, which is substantially orthogonal to Z-axis direction in which the downward impact forces are directed and substantially orthogonal to the Y-axis direction of the rotational axis 27. Those of ordinary skill in the art will appreciate that the acceleration forces Fx are imparted to the drums 12 and 13 by the vibration systems 29.

Typically, in compactors acceleration data on a compactor drum is collected using the Z-axis of the drum, which can be used to calculate the density of the material compacted. The present embodiment, in contrast, orients the accelerometers 405, 406 to collect acceleration data in the X-axis direction of the drums 12, 13 so that X-axis direction displacement of the drums 12, 13 may be calculated. Based on the measured acceleration data and calculated displacement, the amplitude setting of the vibration system 29 may be determined and the appropriate vibration setting can be applied. Accordingly, control logic of controller 400 may monitor amplitude and adjust frequency to achieve a desired performance. By way of example, in certain operational settings, the fastest frequency setting for the vibration system 29 at the detected amplitude setting can be applied by the control system 100. As shown in FIG. 5, in the present embodiment, controller 400 may adjust the rotational speed of the eccentric 23 by sending a signal to control the flow of hydraulic fluid from pump 401 to hydraulic motors 21 which drive eccentric masses 23. By way of example the signal may command the same hydraulic flow to substantially maintain an existing frequency of rotation when the determined amplitude detected is constant and may increase or decrease the hydraulic flow in response to a sensed change in the amplitude in order to increase or decrease the frequency of rotation of the eccentric masses 23 of drums 12, 13 in response to a sensed change in amplitude by accelerometers 405, 406.

Figure 4:
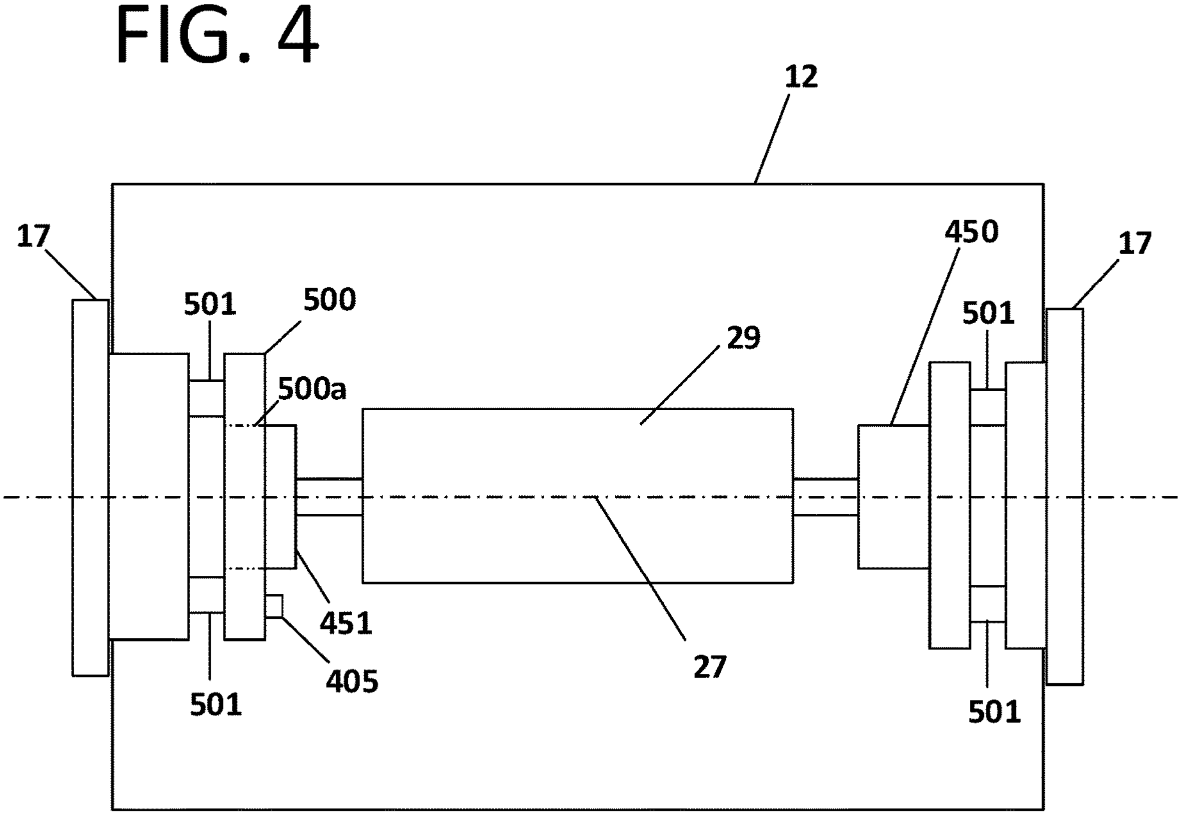
FIG. 4 is a forward perspective view facing the direction of the X-axis showing the drum and the eccentric system and frame according to one embodiment.

Turning now to FIG. 4, the accelerometers 405, 406 are preferably located on carrier plates 500, which support drum axle rotation bearings 451 of the drums 12, 13 in a manner that allows for rotation of the drums 12, 13 relative to the carrier plates 500 and frame or yokes and in a manner that causes the carrier plates 500 to accelerate with the drums 12, 13 in response to rotation of the vibration system 29. As shown in FIG. 4, axle bearing 451 may be located opposite the drive motor 450 used to propel the drums 12, 13. Also shown, the accelerometers 405, 406 are located inside the drum and are positioned to measure back and forth acceleration forces of the drums 12, 13 in X-axis direction as the eccentric mass 23 rotates. Also shown in FIG. 4, the carrier plates are located inside drums 12, 13 axially inward from vibration isolators 501, which are interposed between carrier plate 500 and frame or yokes 17, so that drum accelerations applied to the carrier plate 500 by the drum axle rotation bearings 451 of the drum propulsion system are damped and reduced before being transmitted to the frame or yokes 17. The accelerometers 405, 406 therefore, preferably, are positioned inside the drums 12, 13 to directly measure back and forth acceleration forces of the drums 12, 13 in the X-axis direction before such forces are dampened by any vibration isolators or dampers, as at 501. Within the scope of the present embodiment, the accelerometers 405, 406 may be positioned to measure accelerations in a fixed direction that substantially corresponds to the X-axis direction or the accelerometers 405, 406 may be combined in an inertial measurement unit ("IMU"), which is a device that uses a combination of an accelerometer, gyroscope, and sometimes magnetometer in order to more precisely determine the accelerations of the drums 12, 13 in the X-axis direction.

Figure 8:
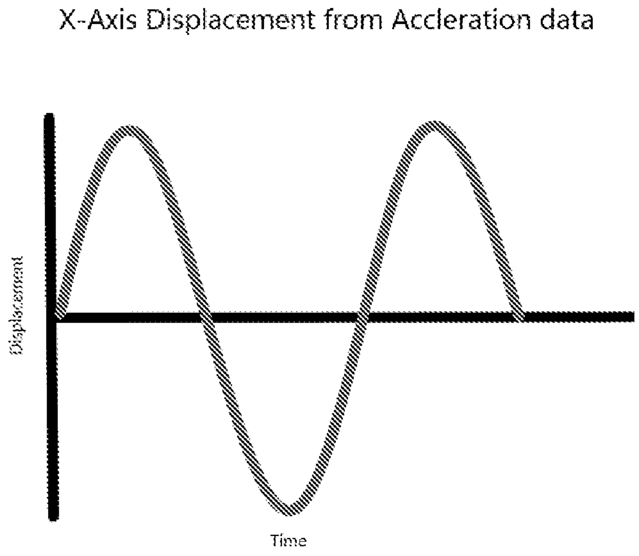
FIG. 8 shows on example of calculated sinusoidal drum displacement in the X-axis direction derived from acceleration data measured in direction that substantially corresponds to the X-axis direction.
Figure 9:
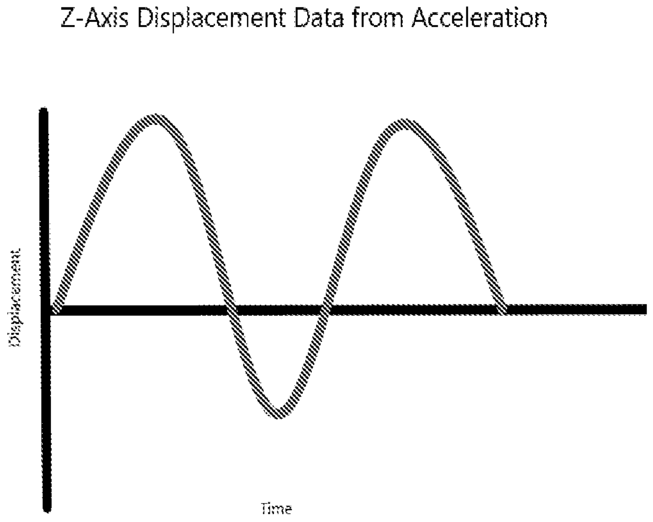
FIG. 9 shows on example of calculated sinusoidal drum displacement data in the Z-axis direction derived from acceleration data measured in direction that substantially corresponds to the Z-axis direction.

Turning now to FIGS. 8 and 9, for the calculation process, using the X-axis provides better data than using the Z-axis. The X-axis data allows for a full range displacement of drum motion unaffected by the sudden impact of the ground that the Z-axis would capture. The benefit of collecting X-axis data is that there is more useable data to calculate displacement, opposed to having to wait a full eccentric rotation for the next set of usable data from the Z-axis data gathering. This also shortens the time needed for the drum to reach working vibration speeds.

Turning now back to FIG. 5, accelerometers 405, 406 measure and send acceleration data to the controller 400, which determines the amplitude from acceleration data. The amplitude may be determined based on an algorithm or by referencing collected acceleration data to corresponding amplitudes, which may, for example, be stored in one or more look up tables.

Controller 400 may include a processor coupled with a memory and an interface circuit, and the interface circuit may provide communication between the components of the control system 100. The processor may thus be configured to execute computer program code in the memory (described below as a non-transitory computer readable medium) to perform at least some of the operations discussed above with respect to FIGS. 4-6. The control system 100 of FIG. 5 may thus control the frequencies of the rotation of eccentric masses 23 in the drums 12, 13. Control logic of controller 400 may monitor the amplitude setting of the eccentric masses 23 in the drums 12, 13 and maintain or adjust the frequency of the eccentric masses 23 of the trailing drum to time the impacts accordingly. In addition to operating the eccentric masses 23 at the fastest rotational speed or frequency for a detected amplitude setting, other frequency settings may as be applied based on the detected amplitude setting. By way of example, the eccentric masses 23 may be rotated at a speed that provides the most efficient compaction for a particular material make up being compacted.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A vibratory compaction machine comprising:

a chassis;

at least one drum rotatable about an axis that faces in a Y-axial direction and mounted to the chassis to allow rotation of the drum over a work surface;

at least one vibration mechanism configured to generate vibrations that are transmitted as impacts directed in a Z-axial direction by the at least one drum to the work surface, the at least one vibration mechanism provided with a plurality of different amplitude settings; and a control system configured to measure acceleration forces of the at least one drum in a direction that substantially corresponds to an X-axial direction, wherein the acceleration forces are generated by the vibration mechanism and the X-axial direction extends in a direction that is substantially orthogonal to the Y-axial direction and the Z-axial direction, the control system determining which of the plurality of drum amplitude settings the vibration mechanism is operating at from the measured acceleration forces of the at least one drum in the direction that substantially corresponds to an X-axial direction.

2. The vibratory compaction machine of claim 1 wherein:

the at least one vibration mechanism is provided with a plurality of different frequency settings;

the control system selects a frequency setting from the plurality of different frequency settings according to the determined amplitude setting, whereby different determined amplitude settings result in selection of different frequency settings; and the control system operates the vibration system at the selected frequency.

3. The vibratory compaction machine of claim 1 wherein:

the at least one vibration mechanism is provided with a plurality of frequency settings, wherein each of the plurality of frequency settings corresponds to one of the plurality of amplitude settings such that each of the plurality of different frequency settings is selectively applied according to the determined amplitude setting;

the control system selects one of the plurality of frequency settings according to the determined amplitude setting; and the control system operates the vibration system at the one selected frequency.

4. The vibratory compaction machine of claim 1 wherein:

the at least one vibration mechanism is provided with a plurality of frequency settings, wherein each of the plurality of frequency settings corresponds to one of the plurality of amplitude settings such that each of the plurality of different frequency settings is selectively applied according to the determined amplitude setting;

the control system:

selects one of the plurality of frequency settings according to the determined amplitude setting;

operates the vibration system at the selected frequency;

selects a new frequency setting in response to a change to the determined amplitude and operates the vibration system at the new selected frequency.

5. The vibratory compaction machine of claim 1 wherein:

the at least one vibration mechanism is provided with a plurality of frequency settings, wherein each of the plurality of frequency settings corresponds to one of the plurality of amplitude settings such that each of the plurality of different frequency settings is selectively applied according to the determined amplitude setting;

the control system:

selects one of the plurality of frequency settings according to the determined amplitude setting;

operates the vibration system at the selected frequency;

remeasures acceleration forces generated by the vibration mechanism in the direction that substantially corresponds to the X-axial direction;

re-determines which of the plurality of drum amplitude settings the vibration mechanism is operating at from the remeasured acceleration forces generated by the vibration mechanism in a direction that substantially corresponds to an X-axial direction;

select a different one of the plurality of frequency settings when the re-determined amplitude setting is different from the determined amplitude setting and corresponds to the selected different one of the plurality of frequency settings; and operates the vibration system at the different selected frequency.

6. The vibratory compaction machine of claim 1 wherein:

the at least one vibration mechanism is provided with a plurality of frequency settings, wherein each of the plurality of frequency settings corresponds to one of the plurality of amplitude settings such that each of the plurality of different frequency settings is selectively applied according to the determined amplitude setting;

the control system:

selects one of the plurality of frequency settings according to the determined amplitude setting;

operates the vibration system at the selected frequency;

remeasures acceleration forces acceleration forces of the at least one drum in the direction that substantially corresponds to an X-axial direction;

re-determines which of the plurality of drum amplitude settings the vibration mechanism is operating at from the remeasured acceleration forces;

selects a different one of the plurality of frequency settings that is greater than the frequency of the selected frequency when the re-determined amplitude setting is less than the amplitude of the determined amplitude setting and corresponds to the selected different one of the plurality of frequency settings; and operates the vibration system at the different selected frequency.

7. The vibratory compaction machine of claim 1 wherein:

the control system includes accelerometers located on a carrier plate that supports a drum axle rotation bearing of the at least one drum in a manner that allows for rotation of the at least one drum relative to the carrier plate; and the carrier plate is located inside the at least one drum axially inward from vibration isolators, which are interposed between carrier plate and a frame so that drum vibrations imparted to the carrier plate by the drum axle rotation bearings are damped and reduced after being measured by the accelerometers and before being transmitted to a frame of the vibration compactor.

8. The vibratory compaction machine of claim 1, wherein the control system includes a controller and at least one accelerometer.

9. A method for operating a vibratory compaction machine provided with a chassis, at least one drum rotatable about an axis that faces in a Y-axial direction and mounted to the chassis to allow rotation of the drum over a work surface, and at least one vibration mechanism provided with a plurality of different amplitude settings and configured to generate vibrations that are transmitted as impacts directed in a Z-axial direction by the at least one drum to the work surface, the at least one vibration mechanism, and comprising:

operating the vibration mechanism to generate acceleration forces in the drum in an X-axial direction, wherein the X-axial direction extends in a direction that is substantially orthogonal to the Y-axial direction and the Z-axial direction;

using a control system provided on the vibratory compaction machine to measure acceleration forces of the at least one drum in a direction that substantially corresponds to the X-axial direction, wherein the acceleration forces are generated by the vibration mechanism; and using the control system to determine which of the plurality of drum amplitude settings the vibration mechanism is operating at from the measured acceleration forces of the at least one drum in the direction that substantially corresponds to an X-axial direction.

10. The method for operating a vibratory compaction machine of claim 9 wherein the at least one vibration mechanism is provided with a plurality of different frequency settings and further comprising using the control system to select a frequency setting from the plurality of different frequency settings according to the determined amplitude setting, whereby different determined amplitude settings result in selection of different frequency settings and using the control system to operate the vibration system at the selected frequency.

11. The method for operating a vibratory compaction machine of claim 9 wherein the at least one vibration mechanism is provided with a plurality of different frequency settings, each of the plurality of frequency settings corresponding to one of the plurality of amplitude settings such that each of the plurality of different frequency settings is selectively applied according to the determined amplitude setting and further comprising using the control system to select one of the plurality of frequency settings from the according to the determined amplitude setting and using the control system to operate the vibration system at the one selected frequency.

12. The method for operating a vibratory compaction machine of claim 9, wherein the at least one vibration mechanism is provided with a plurality of frequency settings, each of the plurality of frequency settings corresponding to one of the plurality of amplitude settings such that each of the plurality of different frequency settings is selectively applied according to the determined amplitude setting and further comprising using the control system to select one of the plurality of frequency settings according to the determined amplitude setting, operate the vibration system at the selected frequency, select a new frequency setting in response to a change to the determined amplitude, and operate the vibration system at the new selected frequency.

* * * * *